(12) United States Patent
Betz et al.

(10) Patent No.: US 12,723,700 B2
(45) Date of Patent: Sep. 1, 2026

(54) MOUNTING DEVICE FOR MOUNTING A CAMERA AND METHOD FOR ORIENTING A CAMERA

(71) Applicant: Siemens Healthineers AG, Forchheim (DE)

(72) Inventors: Tobias Betz, Thalmaessing (DE); David Dederichs, Poxdorf (DE); Frank Herberger, Hoechstadt (DE)

(73) Assignee: SIEMENS HEALTHINEERS AG, Forchheim (DE)

( * ) Notice: Subject to any disclaimer, the term of this patent is extended or adjusted under 35 U.S.C. 154(b) by 3 days.

(21) Appl. No.: 18/952,441

(22) Filed: Nov. 19, 2024

(65) Prior Publication Data

US 2025/0164062 A1 May 22, 2025

(30) Foreign Application Priority Data

Nov. 22, 2023 (EP) .................................... 23211562

(51) Int. Cl.
*F16M 11/10* (2006.01)

(52) U.S. Cl.
CPC ....... *F16M 11/10* (2013.01); *F16M 2200/022* (2013.01)

(58) Field of Classification Search
CPC .... F16M 13/02; F16M 11/10; F16M 11/2014; F16M 13/022; F16M 2200/022; Y10S 248/92; Y10T 403/32008
USPC ....... 248/200.1, 274.1, 276.1, 278.1, 280.11, 248/282.1, 284.1, 317, 323, 324, 325
See application file for complete search history.

(56) References Cited

U.S. PATENT DOCUMENTS 5,975,472 A * 11/1999 Hung .................. F16M 13/022 248/278.1
7,522,213 B2 * 4/2009 Chapman ............. F16F 15/022 248/588
7,562,851 B2 * 7/2009 Hein ...................... F16M 13/04 396/421
7,588,376 B2 * 9/2009 Friedrich ............... F16M 11/08 396/419
7,641,162 B2 * 1/2010 Tsay ..................... F16M 11/043 248/921

(Continued)

FOREIGN PATENT DOCUMENTS

EP 3537023 B1 2/2021
EP 4137734 A1 2/2023

*Primary Examiner* — Terrell L Mckinnon
*Assistant Examiner* — Michael McDuffie
(74) *Attorney, Agent, or Firm* — Harness, Dickey & Pierce, P.L.C.

(57) ABSTRACT

A camera-end part receives a camera and is mounted to swivel around a camera-end swivel axis via a camera-end swivel bearing when a camera-end locking mechanism is undone. A camera-end adapter is mounted to swivel around an adapter swivel axis via an adapter swivel bearing when an adapter locking mechanism is undone. A cable routing region extends along a longitudinal line of the cable routing region through a support structure-end adapter and the camera-end adapter into a camera-end part. The longitudinal line of the cable routing region runs substantially perpendicular to the adapter swivel axis in the region of the adapter swivel axis. The adapter swivel bearing and the adapter locking mechanism are arranged outside the cable routing region.

20 Claims, 5 Drawing Sheets

(56) References Cited

U.S. PATENT DOCUMENTS

| | | | | |
|---|---|---|---|---|
| 7,959,120 | B2 * | 6/2011 | Liao | B60R 11/0252 248/292.12 |
| 8,205,847 | B2 | 6/2012 | Dorris et al. | |
| 8,453,987 | B2 * | 6/2013 | Pettey | A63H 29/22 248/278.1 |
| 8,794,579 | B2 * | 8/2014 | Sturman | F16M 11/041 248/921 |
| 9,010,709 | B1 * | 4/2015 | Culpepper | A61G 12/002 248/324 |
| 10,948,946 | B2 | 3/2021 | Borloz et al. | |
| 11,194,231 | B2 * | 12/2021 | Su | G03B 17/561 |
| 11,530,774 | B2 * | 12/2022 | Borloz | F16M 11/105 |
| 12,075,152 | B2 * | 8/2024 | Nordquist | F16M 11/205 |
| 2003/0201371 | A1 * | 10/2003 | Zadok | B65D 83/53 248/276.1 |
| 2014/0263866 | A1 * | 9/2014 | Hemmer | F16M 13/027 248/323 |
| 2016/0076583 | A1 * | 3/2016 | Karai | F16C 11/0609 248/278.1 |
| 2016/0187609 | A1 * | 6/2016 | Jin | G02B 7/004 211/13.1 |
| 2021/0247667 | A1 * | 8/2021 | Chu | F16M 11/10 |
| 2023/0194047 | A1 * | 6/2023 | Unice | G02B 23/16 248/278.1 |

* cited by examiner

TD
D
T1
K
1, 2
20
3
y
10
M
z
AS
13
9
12
11
G

MOUNTING DEVICE FOR MOUNTING A CAMERA AND METHOD FOR ORIENTING A CAMERA

CROSS-REFERENCE TO RELATED APPLICATION(S)

The present application claims priority under 35 U.S.C. § 119 to European Patent Application No. 23211562.6, filed Nov. 22, 2023, the entire contents of which is incorporated herein by reference.

FIELD

One or more embodiments of the present invention relate to a mounting device for mounting a camera. One or more embodiments of the present invention further relate to a method for orienting a camera.

BACKGROUND

Installing a camera and comparable sensors in the environment of medical imaging systems, for example on a ceiling of a medical examination room, is a challenge in particular because, in addition to conventional building automation installations, such as for example for lighting, air conditioning, smoke alarms and sprinkler systems, specific clinical equipment, such as patient lifts, ceiling brackets for monitors, radiation protection and injection apparatus must also be mounted. This circumstance demands flexibility with regard to the spatial positioning of the camera in order to orient the camera's field of view onto the relevant region of the medical device. Too many degrees of freedom may, however, have a disadvantageous impact on the orientation process. Moreover, cables for the camera should as far as possible be routed in concealed manner and reliably protected from pinching.

SUMMARY

An object of one or more embodiments of the present invention is to provide an alternative to conventional solutions relating to mounting a camera. Each subject of an independent claim leads to the achievement of at least this object. The dependent claims address further advantageous aspects of embodiments of the present invention.

Independent of the grammatical term usage, individuals with male, female or other gender identities are included within the term.

An embodiment of the present invention relates to a mounting device for mounting a camera,

- wherein the mounting device has a camera-end part, a camera-end swivel bearing, a camera-end locking mechanism, a camera-end adapter, a support structure-end adapter, an adapter swivel bearing, an adapter locking mechanism and a cable routing region,
- wherein the camera-end part is set up to receive the camera and is mounted swivelably relative to the camera-end adapter around a camera-end swivel axis via the camera-end swivel bearing when the camera-end locking mechanism is undone,
- wherein the camera-end adapter is mounted swivelably relative to the support structure-end adapter around an adapter swivel axis via the adapter swivel bearing when the adapter locking mechanism is undone,
- wherein the cable routing region extends along a longitudinal line of the cable routing region through the support structure-end adapter and the camera-end adapter into the camera-end part,
- wherein the longitudinal line of the cable routing region runs substantially perpendicularly to the adapter swivel axis in the region of the adapter swivel axis,
- wherein the adapter swivel bearing and the adapter locking mechanism are arranged outside the cable routing region.

A mounting device for mounting a sensor is furthermore hereby disclosed,

- wherein the mounting device has a sensor-end part, a sensor-end swivel bearing, a sensor-end locking mechanism, a sensor-end adapter, a support structure-end adapter, an adapter swivel bearing, an adapter locking mechanism and a cable routing region,
- wherein the sensor-end part is set up to receive the sensor and is mounted swivelably relative to the sensor-end adapter around a sensor-end swivel axis via the sensor-end swivel bearing when the sensor-end locking mechanism is undone,
- wherein the sensor-end adapter is mounted swivelably relative to the support structure-end adapter around an adapter swivel axis via the adapter swivel bearing when the adapter locking mechanism is undone,
- wherein the cable routing region extends along a longitudinal line of the cable routing region through the support structure-end adapter and the sensor-end adapter into the sensor-end part,
- wherein the longitudinal line of the cable routing region runs substantially perpendicularly to the adapter swivel axis in the region of the adapter swivel axis,
- wherein the adapter swivel bearing and the adapter locking mechanism are arranged outside the cable routing region.

In particular, the mounting device for mounting the sensor can be embodied according to one or more of the aspects described below for the mounting device for mounting the camera. The term "camera-end" can here in particular be replaced by the term "sensor-end" and/or the term "camera" by the term "sensor". A method for orienting a sensor is furthermore hereby disclosed. In particular, the method for orienting the sensor can be embodied according to one or more of the aspects described below of methods for orienting the camera. The term "camera-end" can here in particular be replaced by the term "sensor-end" and/or the term "camera" by the term "sensor".

In particular, it can be provided that a portion of the longitudinal line of the cable routing region running through the camera-end adapter runs substantially perpendicularly to the adapter swivel axis in the region of the adapter swivel axis and/or that runs substantially perpendicularly to the camera-end swivel axis in the region of the camera-end swivel axis. In particular, it can be provided that the camera-end swivel bearing and the camera-end locking mechanism are arranged outside the cable routing region.

The camera-end part can in particular be set up to receive the camera in form-locked and/or non-destructively undoable manner. The support structure-end adapter can be connected to a support structure, for example via a support structure-end part and a support structure interface. The support structure can, for example, be a ceiling, a wall and/or a bracket.

In particular, it can be provided that the camera-end part is immobilized relative to the camera-end adapter against a swiveling movement around the camera-end swivel axis via the camera-end locking mechanism when the camera-end locking mechanism is tightened, and/or that the camera-end adapter is immobilized relative to the support structure-end adapter against a swiveling movement around the adapter swivel axis via the adapter locking mechanism when the adapter locking mechanism is tightened.

In particular, the longitudinal line can run within the cable routing region in such a way that a cable can run on the longitudinal line through the cable routing region. The longitudinal line can be a center line of the cable routing region and/or deviate from a center line of the cable routing region. In particular, it is possible to provide a plurality of cable routing regions in the mounting device that can be contiguous with one another and/or run substantially parallel to one another.

The camera may for example be a 2D camera and/or a 3D camera. This solution enables a self-contained mechanical structure that requires little space, wherein the hollow embodiment simultaneously permits integrated cable routing in the mounting device.

One embodiment provides that the camera-end swivel axis is perpendicular to the adapter swivel axis. In particular, the camera-end swivel axis and the adapter swivel axis can form the axes of a universal joint, in particular of a hollow universal joint.

One embodiment provides that the camera-end swivel axis and the adapter swivel axis are spaced apart from one another along a portion of the longitudinal line of the cable routing region running through the camera-end adapter, in particular are spaced apart in such a way that the camera-end swivel axis is located along the longitudinal line of the cable routing region between the adapter swivel axis and the camera when the camera is received in the camera-end part. The camera-end swivel axis can in particular be skew to the adapter swivel axis.

One embodiment provides that the camera-end adapter has a frame, a first plate-shaped projection and a second plate-shaped projection, wherein the cable routing region extends through the frame, wherein the first plate-shaped projection extends flat in a first plane from the frame up to a first region of the adapter swivel bearing, wherein the first plane is perpendicular to the adapter swivel axis, wherein the second plate-shaped projection extends flat in a second plane from the frame up to a second region of the adapter swivel bearing, wherein the second plane is perpendicular to the adapter swivel axis, wherein the cable routing region is located in the region of the camera-end adapter between the first plane and the second plane.

The frame can, for example, be four-sided. The frame can, for example, be continuous right around the longitudinal line of the cable routing region. In particular, it can be provided that the cable routing region is located in the region of the adapter swivel axis between the first plate-shaped projection and the second plate-shaped projection and/or that the cable routing region is located in the region of the adapter swivel axis between the first region of the adapter swivel bearing and the second region of the adapter swivel bearing.

In particular, it can be provided that the camera-end adapter has a third plate-shaped projection and a fourth plate-shaped projection, wherein the third plate-shaped projection extends flat in a third plane from the frame up to a first region of the camera-end swivel bearing, wherein the third plane is perpendicular to the camera-end swivel axis, wherein the fourth plate-shaped projection extends flat in a fourth plane from the frame up to a second region of the camera-end swivel bearing, wherein the fourth plane is perpendicular to the camera-end swivel axis, wherein the cable routing region is located in the region of the camera-end adapter between the third plane and the fourth plane.

One embodiment provides that the frame has a first frame side face and a second frame side face, wherein the first region of the adapter swivel bearing is connected to the first frame side face via the first plate-shaped projection, wherein the second region of the adapter swivel bearing is connected to the second frame side face via the second plate-shaped projection.

One embodiment provides that the first frame side face is perpendicular to the adapter swivel axis and one edge of the first frame side face is curved in a circular arc shape around the adapter swivel axis, wherein the second frame side face is perpendicular to the adapter swivel axis and one edge of the second frame side face is curved in a circular arc shape around the adapter swivel axis.

In particular, it can be provided that the frame has a third frame side face and a fourth frame side face, wherein the first region of the camera-end swivel bearing is connected to the third frame side face via the third plate-shaped projection, wherein the second region of the camera-end swivel bearing is connected to the fourth frame side face via the fourth plate-shaped projection. In particular, it can be provided that the third frame side face is perpendicular to the camera-end swivel axis and one edge of the third frame side face is curved in a circular arc shape around the camera-end swivel axis, wherein the fourth frame side face is perpendicular to the camera-end swivel axis and one edge of the fourth frame side face is curved in a circular arc shape around the camera-end swivel axis.

The first frame side face can in particular be planar and/or parallel to the first plane. The first frame side face and the first plate-shaped projection can in particular be coplanar and/or adjoin one another flat, in particular adjoin one another flat in an adjoining plane substantially parallel to the first plane. The second frame side face can in particular be planar and/or parallel to the second plane. The second frame side face and the second plate-shaped projection can in particular be coplanar and/or adjoin one another flat, in particular adjoin one another flat in an adjoining plane substantially parallel to the second plane.

The third frame side face can in particular be planar and/or parallel to the third plane. The third frame side face and the third plate-shaped projection can in particular be coplanar and/or adjoin one another flat, in particular adjoin one another flat in an adjoining plane substantially parallel to the third plane. The fourth frame side face can in particular be planar and/or parallel to the fourth plane. The fourth frame side face and the fourth plate-shaped projection can in particular be coplanar and/or adjoin one another flat, in particular adjoin one another flat in an adjoining plane substantially parallel to the fourth plane. In particular, it can be provided that the first frame side face and the second frame side face are connected to one another via the third frame side face and the fourth frame side face.

One embodiment provides that the support structure-end adapter has a first support structure-end side face and a second support structure-end side face, wherein the cable routing region is located in the region of the support structure-end adapter between the first support structure-end side face and the second support structure-end side face, wherein the first support structure-end side face is perpendicular to the adapter swivel axis and one edge of the first support structure-end side face is curved in a circular arc shape around the adapter swivel axis, wherein the edge of the first support structure-end side face abuts the edge of the first frame side face, in particular abuts it in such a way that a gap runs in a circular arc shape around the adapter swivel axis between the edge of the first support structure-end side face and the edge of the first frame side face, wherein the second support structure-end side face is perpendicular to the adapter swivel axis and one edge of the second support structure-end side face is curved in a circular arc shape around the adapter swivel axis, wherein the edge of the second support structure-end side face abuts the edge of the second frame side face, in particular abuts it in such a way that a gap runs in a circular arc shape around the adapter swivel axis between the edge of the second support structure-end side face and the edge of the second frame side face.

The camera-end adapter can thus be swiveled relative to the support structure-end adapter around the adapter swivel axis within a corresponding angular range without enlarging the gap between the edges of the side faces. It is thus possible, via the frame side faces and the support structure-end side face, to delimit the cable routing region from the surroundings at various angular positions that can be reached via a swiveling movement of the camera-end adapter relative to the support structure-end adapter around the adapter swivel axis.

In particular, it can be provided that the edge of the first frame side face is concavely curved in a circular arc shape around the adapter swivel axis, that the edge of the second frame side face is concavely curved in a circular arc shape around the adapter swivel axis, that the edge of the first support structure-end side face is convexly curved in a circular arc shape around the adapter swivel axis, and that the edge of the second support structure-end side face is convexly curved in a circular arc shape around the adapter swivel axis. Alternatively, it can be provided that the edge of the first frame side face is convexly curved in a circular arc shape around the adapter swivel axis, that the edge of the second frame side face is convexly curved in a circular arc shape around the adapter swivel axis, that the edge of the first support structure-end side face is concavely curved in a circular arc shape around the adapter swivel axis, and that the edge of the second support structure-end side face is concavely curved in a circular arc shape around the adapter swivel axis.

In particular, it can be provided that the camera-end part has a first camera-end side face and a second camera-end side face, wherein the cable routing region is located in the region of the camera-end part between the first camera-end side face and the second camera-end side face, wherein the first camera-end side face is perpendicular to the camera-end swivel axis and one edge of the first camera-end side face is curved in a circular arc shape around the camera-end swivel axis, wherein the edge of the first camera-end side face abuts the edge of the third frame side face, in particular abuts it in such a way that a gap runs in a circular arc shape around the camera-end swivel axis between the edge of the first camera-end side face and the edge of the third frame side face, wherein the second camera-end side face is perpendicular to the camera-end swivel axis and one edge of the second camera-end side face is curved in a circular arc shape around the camera-end swivel axis, wherein the edge of the second camera-end side face abuts the edge of the fourth frame side face, in particular abuts it in such a way that a gap runs in a circular arc shape around the camera-end swivel axis between the edge of the second camera-end side face and the edge of the fourth frame side face.

In particular, it can be provided that the edge of the third frame side face is concavely curved in a circular arc shape around the camera-end swivel axis, that the edge of the fourth frame side face is concavely curved in a circular arc shape around the camera-end swivel axis, that the edge of the first camera-end side face is convexly curved in a circular arc shape around the camera-end swivel axis, and that the edge of the second camera-end side face is convexly curved in a circular arc shape around the camera-end swivel axis.

Alternatively, it can be provided that the edge of the third frame side face is convexly curved in a circular arc shape around the camera-end swivel axis, that the edge of the fourth frame side face is convexly curved in a circular arc shape around the camera-end swivel axis, that the edge of the first camera-end side face is concavely curved in a circular arc shape around the camera-end swivel axis, and that the edge of the second camera-end side face is concavely curved in a circular arc shape around the camera-end swivel axis.

One embodiment provides that the mounting device has a support structure-end part, a support structure-end swivel bearing and a support structure-end locking mechanism, wherein the support structure-end adapter is mounted swivelably relative to the support structure-end part around a support structure-end swivel axis via the support structure-end swivel bearing when the support structure-end locking mechanism is undone, wherein the cable routing region extends along the longitudinal line of the cable routing region through the support structure-end part up to the support structure-end adapter, wherein a portion of the longitudinal line of the cable routing region running through the support structure-end part is substantially parallel to the support structure-end swivel axis, wherein the support structure-end swivel bearing and the support structure-end locking mechanism are arranged outside the cable routing region.

In particular, it can be provided that the support structure-end adapter is immobilized relative to the support structure-end part against a swiveling movement around the support structure-end swivel axis via the support structure-end locking mechanism when the support structure-end locking mechanism is tightened.

One embodiment provides that the support structure-end swivel axis is perpendicular to the adapter swivel axis. In particular, it can be provided that the support structure-end swivel axis is coplanar with the camera-end swivel axis.

One embodiment provides that the support structure-end swivel axis and the adapter swivel axis are spaced apart from one another along a portion of the longitudinal line of the cable routing region running through the support structure-end adapter, in particular are spaced in such a way that the adapter swivel axis is located along the longitudinal line of the cable routing region between the support structure-end swivel axis and the camera-end swivel axis.

One embodiment provides that the mounting device has a power supply unit and a power cable for supplying the camera with electrical power, wherein the power supply unit is arranged in the interior of the support structure-end part, wherein the power cable runs within the cable routing region from the power supply unit into the camera-end part, in particular substantially follows along the course of the longitudinal line of the cable routing region.

One embodiment provides that the support structure-end part is cylindrical, wherein a cylinder axis of the support structure-end part forms the support structure-end swivel axis. The support structure-end part can, for example, be a hollow tube.

One embodiment provides that the support structure-end locking mechanism has a first clamping wedge, wherein tightening of the support structure-end locking mechanism presses the first clamping wedge against a circumferential surface of the support structure-end part in such a way that the support structure-end adapter is frictionally immobilized relative to the support structure-end part.

In particular, it can be provided that the support structure-end adapter has a first connecting unit,

- wherein the support structure-end part has a second connecting unit that is configured correspondingly to the first connecting unit in such a way that a connection can be produced via the first connecting unit and the second connecting unit, which connection form-lockingly counteracts translational motion of the support structure-end adapter relative to the support structure-end part that is parallel to the support structure-end swivel axis when the support structure-end locking mechanism is undone,
- wherein the support structure-end adapter is mounted swivelably relative to the support structure-end part around the support structure-end swivel axis via the support structure-end swivel bearing when the support structure-end locking mechanism is undone and the connection is produced via the first connecting unit and the second connecting unit.

The connection via the first connecting unit and the second connecting unit secures the support structure-end adapter against translational motion parallel to the support structure-end swivel axis relative to the support structure-end part, in particular against falling out, while a swiveling movement of the support structure-end adapter relative to the support structure-end part around the support structure-end swivel axis can adjust an angular position around the support structure-end swivel axis.

In particular, it can be provided that frictional immobilization of the support structure-end adapter relative to the support structure-end part secures the support structure-end adapter both against translational motion parallel to the support structure-end swivel axis relative to the support structure-end part and against a swiveling movement around the support structure-end swivel axis relative to the support structure-end part.

An embodiment of the present invention further relates to a system comprising a medical imaging device, a camera and a mounting device according to an embodiment of the present invention for mounting the camera, wherein the camera is received in the camera-end part of the mounting device. In particular, it can be provided that the support structure-end swivel axis is substantially vertical and/or that the adapter swivel axis is substantially horizontal. The system can in particular have a set of cables that, originating for example from the support structure, run within the cable routing region into the camera-end part and are connected to the camera. The system can for example include the support structure interface and/or the support structure.

One embodiment provides that the medical imaging device is a computed tomography device, a C-arm X-ray machine, or a magnetic resonance tomography device.

An embodiment of the present invention further relates to a method for orienting a camera, wherein the camera is received in the camera-end part of a mounting device according to an embodiment of the present invention, wherein the camera-end locking mechanism is undone, the camera-end part is swiveled relative to the camera-end adapter around the camera-end swivel axis and the camera-end locking mechanism is tightened, wherein the adapter locking mechanism is undone, the camera-end adapter is swiveled relative to the support structure-end adapter around the adapter swivel axis and the adapter locking mechanism is tightened.

One embodiment provides that the support structure-end locking mechanism is undone, the support structure-end adapter is swiveled relative to the support structure-end part around the support structure-end swivel axis and the camera-end locking mechanism is tightened. In particular, a swiveling movement of the camera-end part relative to the camera-end adapter around the camera-end swivel axis and a swiveling movement of the support structure-end adapter relative to the support structure-end part around the support structure-end swivel axis can be combined in such a way that the camera-end part is purely spatially translated and/or that the positional change of the camera-end part does not have a rotational component, wherein the camera-end swivel axis is parallel to the support structure-end swivel axis. In this way, an adjustment range of the translational orientation can be defined by the distance of the camera-end swivel axis and the support structure-end swivel axis from one another.

For the purposes of the present invention, features which are described in relation to different embodiments of the present invention and/or different categories of claim (method, use, device, system, arrangement etc.) may be combined to yield further embodiments of the present invention. For example, a claim relating to a device may also be further developed with features which are described or claimed in connection with a method and vice versa. Functional features of a method may in this case be embodied by appropriately configured physical components. Use of the indefinite article "a" or "an" does not rule out the possibility of the feature in question also being present in multiple instances. Substantially parallel can, for example, be taken to mean precisely parallel or an angular distance with an absolute value of less than 2 degrees, in particular of less than 1 degree. Substantially perpendicular can, for example, be taken to mean precisely perpendicular or an angular distance of between 88 degrees and 92 degrees, in particular between 89 degrees and 91 degrees.

BRIEF DESCRIPTION OF THE DRAWINGS

The present invention is explained below with reference to exemplary embodiments and to the appended figures. The depictions in the figures are schematic, highly simplified and not necessarily true to scale.

DETAILED DESCRIPTION

Figure 1:
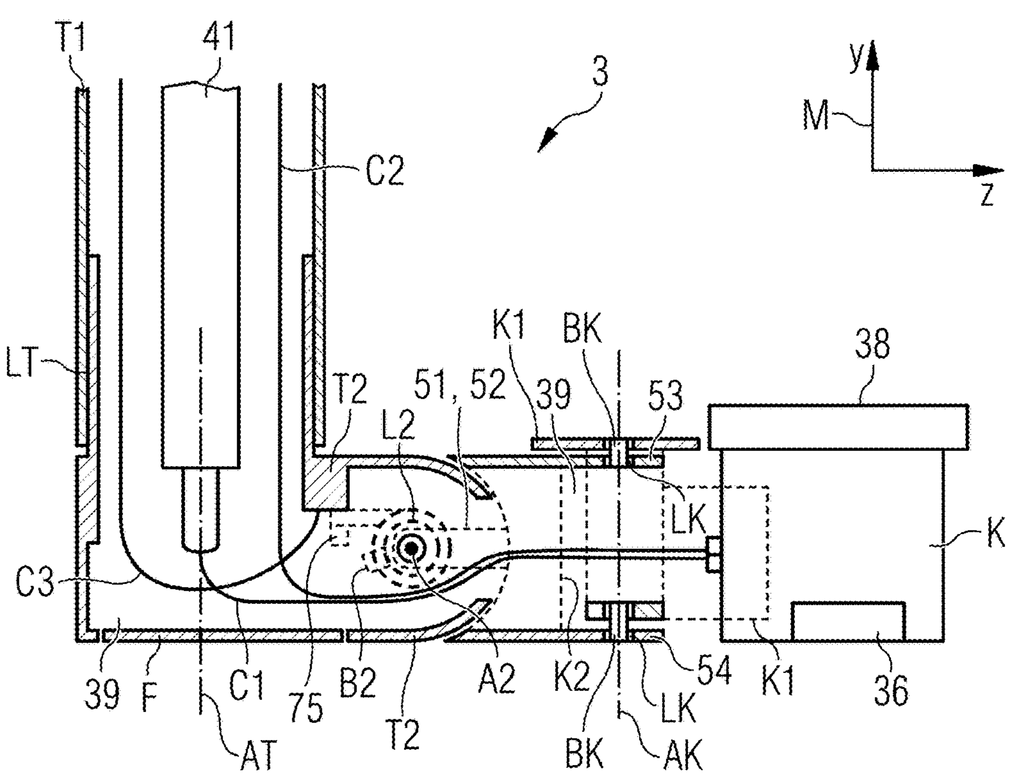
FIG. 1, FIG. 2, FIG. 3, FIG. 4, FIG. 5 and FIG. 6 in each case show a mounting device according to a first example.
Figure 2:
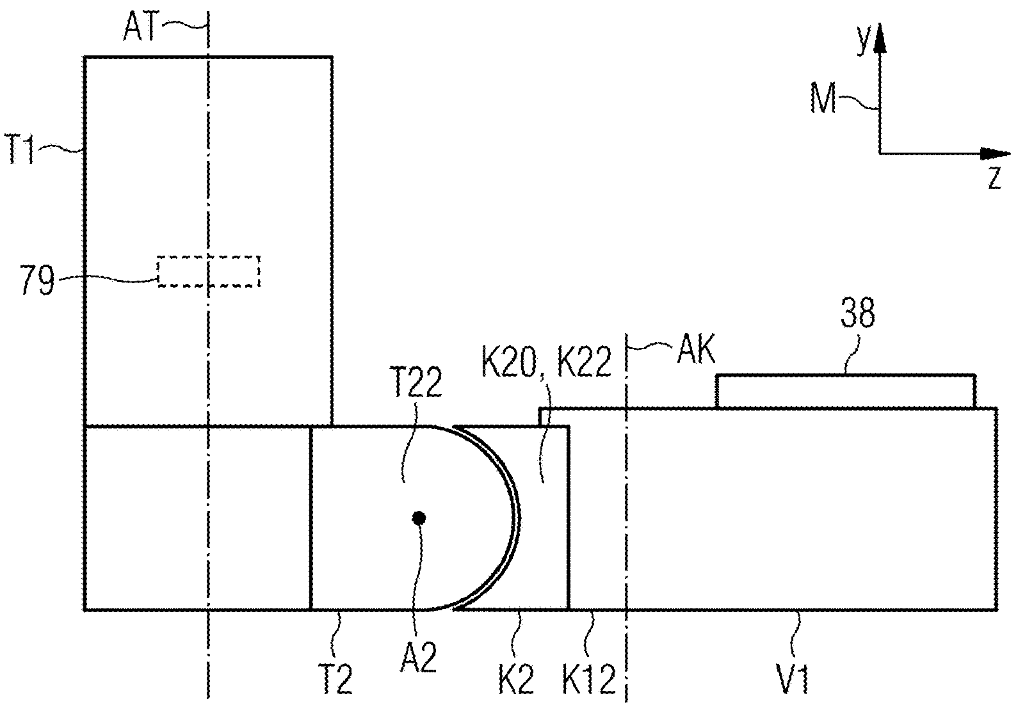
Figure 3:
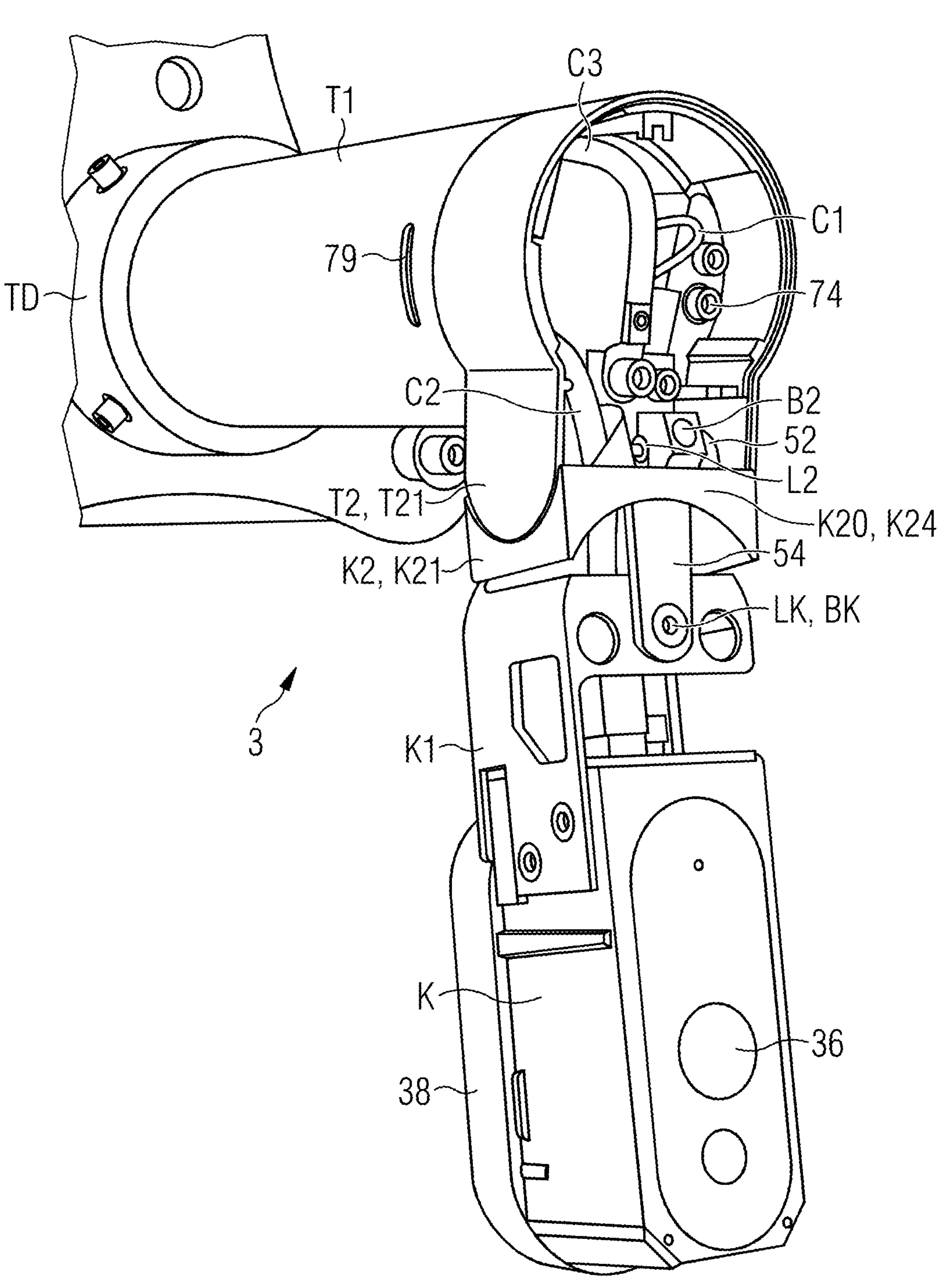
Figure 4:
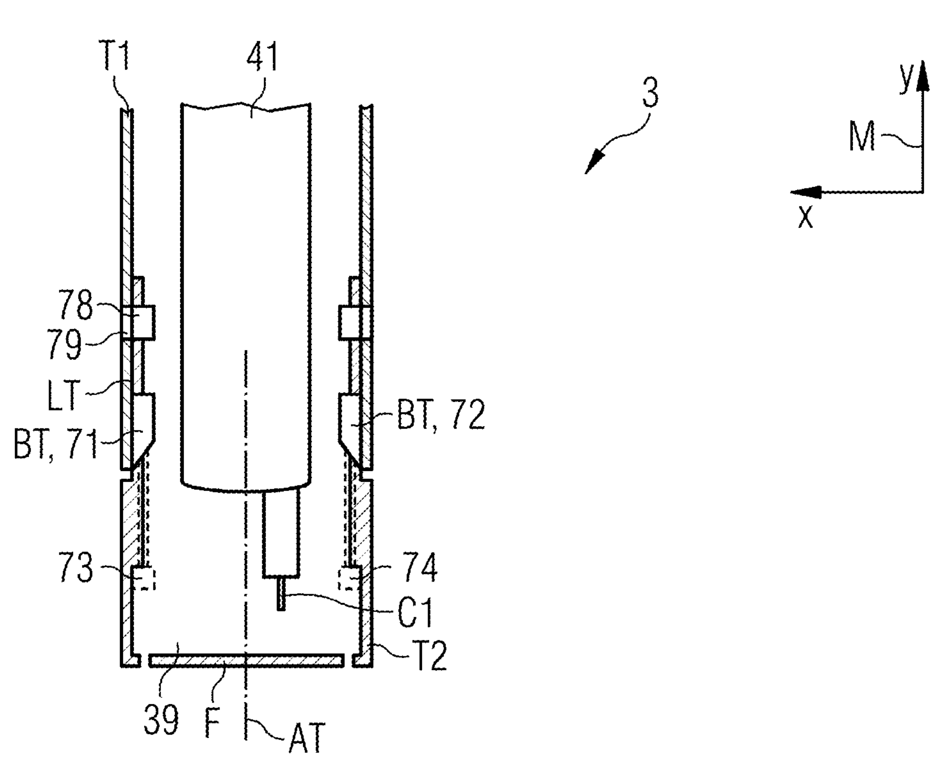

FIG. 1 shows the mounting device 3 for mounting a camera K, wherein the mounting device 3 has a camera-end part K1, a camera-end swivel bearing LK, a camera-end locking mechanism BK, a camera-end adapter K2, a support structure-end adapter T2, an adapter swivel bearing L2, an adapter locking mechanism B2 and a cable routing region 39, wherein the camera-end part K1 is set up to receive the camera K and is mounted swivelably relative to the camera-end adapter K2 around a camera-end swivel axis AK via the camera-end swivel bearing LK when the camera-end locking mechanism BK is undone, wherein the camera-end adapter K2 is mounted swivelably relative to the support structure-end adapter T2 around an adapter swivel axis A2 via the adapter swivel bearing L2 when the adapter locking mechanism B2 is undone, wherein the cable routing region 39 extends along a longitudinal line of the cable routing region 39 through the support structure-end adapter T2 and the camera-end adapter K2 into the camera-end part K1, wherein the longitudinal line of the cable routing region 39 runs substantially perpendicularly to the adapter swivel axis A2 in the region of the adapter swivel axis A2, wherein the adapter swivel bearing L2 and the adapter locking mechanism B2 are arranged outside the cable routing region 39.

The camera-end swivel axis AK is perpendicular to the adapter swivel axis A2. The camera-end swivel axis AK and the adapter swivel axis A2 are spaced apart from one another along a portion of the longitudinal line of the cable routing region 39 running through the camera-end adapter K2.

The example shown provides that the camera-end adapter K2 has a frame K20, a first plate-shaped projection 51 and a second plate-shaped projection 52, wherein the cable routing region 39 extends through the frame K20, wherein the first plate-shaped projection 51 extends flat in a first plane from the frame K20 up to a first region of the adapter swivel bearing L2, wherein the first plane is perpendicular to the adapter swivel axis A2, wherein the second plate-shaped projection 52 extends flat in a second plane from the frame K20 up to a second region of the adapter swivel bearing L2, wherein the second plane is perpendicular to the adapter swivel axis A2, wherein the cable routing region 39 is located in the region of the camera-end adapter K2 between the first plane and the second plane.

The frame K20 can, for example, be four-sided. The frame K20 can, for example, be continuous right around the longitudinal line of the cable routing region 39. In particular, it can be provided that the cable routing region 39 is located in the region of the adapter swivel axis A2 between the first plate-shaped projection 51 and the second plate-shaped projection 52 and/or that the cable routing region 39 is located in the region of the adapter swivel axis A2 between the first region of the adapter swivel bearing L2 and the second region of the adapter swivel bearing L2.

The example shown provides that the camera-end adapter K2 has a third plate-shaped projection 53 and a fourth plate-shaped projection 54, wherein the third plate-shaped projection 53 extends flat in a third plane from the frame K20 up to a first region of the camera-end swivel bearing LK, wherein the third plane is perpendicular to the camera-end swivel axis AK, wherein the fourth plate-shaped projection 54 extends flat in a fourth plane from the frame K20 up to a second region of the camera-end swivel bearing LK, wherein the fourth plane is perpendicular to the camera-end swivel axis AK, wherein the cable routing region 39 is located in the region of the camera-end adapter K2 between the third plane and the fourth plane.

The example shown provides that the frame K20 has a first frame side face K21 and a second frame side face K22, wherein the first region of the adapter swivel bearing L2 is connected to the first frame side face K21 via the first plate-shaped projection 51, wherein the second region of the adapter swivel bearing L2 is connected to the second frame side face K22 via the second plate-shaped projection 52, wherein the first frame side face K21 is perpendicular to the adapter swivel axis A2 and one edge of the first frame side face K21 is curved in a circular arc shape around the adapter swivel axis A2, wherein the second frame side face K22 is perpendicular to the adapter swivel axis A2 and one edge of the second frame side face K22 is curved in a circular arc shape around the adapter swivel axis A2.

The example shown provides that the frame K20 has a third frame side face K23 and a fourth frame side face K23,— wherein the first region of the camera-end swivel bearing LK is connected to the third frame side face K23 via the third plate-shaped projection 53, wherein the second region of the camera-end swivel bearing LK is connected to the fourth frame side face K24 via the fourth plate-shaped projection 54, wherein the third frame side face K23 is perpendicular to the camera-end swivel axis AK and one edge of the third frame side face K23 is curved in a circular arc shape around the camera-end swivel axis AK, wherein the fourth frame side face K24 is perpendicular to the camera-end swivel axis AK and one edge of the fourth frame side face K24 is curved in a circular arc shape around the camera-end swivel axis AK.

The example shown provides that the support structure-end adapter piece T2 has a first support structure-end side face T21 and a second support structure-end side face T22, wherein the cable routing region 39 is located in the region of the support structure-end adapter K2 between the first support structure-end side face T21 and the second support structure-end side face T22, wherein the first support structure-end side face T21 is perpendicular to the adapter swivel axis A2 and one edge of the first support structure-end side face T21 is curved in a circular arc shape around the adapter swivel axis A2, wherein the edge of the first support structure-end side face T21 abuts the edge of the first frame side face K21, in particular abuts it in such a way that a gap runs in a circular arc shape around the adapter swivel axis A2 between the edge of the first support structure-end side face T21 and the edge of the first frame side face K21, wherein the second support structure-end side face T22 is perpendicular to the adapter swivel axis A2 and one edge of the second support structure-end side face T22 is curved in a circular arc shape around the adapter swivel axis A2, wherein the edge of the second support structure-end side face T22 abuts the edge of the second frame side face K22, in particular abuts it in such a way that a gap runs in a circular arc shape around the adapter swivel axis A2 between the edge of the second support structure-end side face T22 and the edge of the second frame side face K22.

The example shown provides that the camera-end part K1 has a first camera-end side face K11 and a second camera-end side face K12, wherein the cable routing region 39 is located in the region of the camera-end part K1 between the first camera-end side face K11 and the second camera-end side face K12, wherein the first camera-end side face K11 is perpendicular to the camera-end swivel axis AK and one edge of the first camera-end side face K11 is curved in a circular arc shape around the camera-end swivel axis AK, wherein the edge of the first camera-end side face K11 abuts the edge of the third frame side face K23, in particular abuts it in such a way that a gap runs in a circular arc shape around the camera-end swivel axis AK between the edge of the first camera-end side face K11 and the edge of the third frame side face K23, wherein the second camera-end side face K12 is perpendicular to the camera-end swivel axis AK and one edge of the second camera-end side face K12 is curved in a circular arc shape around the camera-end swivel axis AK, wherein the edge of the second camera-end side face K12 abuts the edge of the fourth frame side face K24, in particular abuts it in such a way that a gap runs in a circular arc shape around the camera-end swivel axis AK between the edge of the second camera-end side face K12 and the edge of the fourth frame side face K24.

The example shown provides that the mounting device 3 has a support structure-end part T1, a support structure-end swivel bearing LT and a support structure-end locking mechanism BT, wherein the support structure-end adapter T2 is mounted swivelably relative to the support structure-end part T1 around a support structure-end swivel axis AT via the support structure-end swivel bearing LT when the support structure-end locking mechanism BT is undone, wherein the cable routing region 39 extends along the longitudinal line of the cable routing region 39 through the support structure-end part T1 up to the support structure-end adapter T2, wherein a portion of the longitudinal line of the cable routing region 39 running through the support structure-end part T1 is substantially parallel to the support structure-end swivel axis AT, wherein the support structure-end swivel bearing LT and the support structure-end locking mechanism BT are arranged outside the cable routing region 39.

The support structure-end swivel axis AT is perpendicular to the adapter swivel axis A2. The support structure-end swivel axis AT and the adapter swivel axis A2 are spaced apart from one another along a portion of the longitudinal line of the cable routing region 39 running through the support structure-end adapter T2. The support structure-end part T1 is cylindrical, wherein a cylinder axis of the support structure-end part T1 forms the support structure-end swivel axis AT.

The example shown provides that the mounting device 3 has a power supply unit 41 and a power cable C1 for supplying the camera K with electrical power, wherein the power supply unit 41 is arranged in the interior of the support structure-end part T1, wherein the power cable C1 runs within the cable routing region 39 from the power supply unit 41 into the camera-end part K1.

The example shown provides that the support structure-end locking mechanism BT has a first clamping wedge 71, wherein tightening of the support structure-end locking mechanism BT presses the first clamping wedge 71 against a circumferential surface of the support structure-end part T1 in such a way that the support structure-end adapter T2 is frictionally immobilized relative to the support structure-end part T1.

The example shown provides that the support structure-end adapter piece T2 has a first connecting unit 78, wherein the support structure-end part T1 has a second connecting unit 79 that is configured correspondingly to the first connecting unit 78 in such a way that a connection can be produced via the first connecting unit 78 and the second connecting unit 79, which connection form-lockingly counteracts translational motion of the support structure-end adapter T2 relative to the support structure-end part T1 that is parallel to the support structure-end swivel axis AT when the support structure-end locking mechanism BT is undone, wherein the support structure-end adapter T2 is mounted swivelably relative to the support structure-end part T1 around the support structure-end swivel axis AT via the support structure-end swivel bearing LT when the support structure-end locking mechanism BT is undone and the connection is produced via the first connecting unit 78 and the second connecting unit 79.

The mounting device 3 includes cladding part F which is detachably connected to the support structure-end adapter piece T2. The mounting device 3 furthermore includes data cable C2 and earthing cable C3. The adapter swivel bearing L2 is connected via the screw fastening 75 to the support structure-end adapter T2. In conjunction with the camera-end adapter K2, the adapter swivel bearing L2 and the camera-end swivel bearing LK form a hollow universal joint. The camera 3 is a 3D camera with lens 36 and convective heat sink 38. The coordinate system M shows the spatial directions.

The camera-end part V1 includes camera-end cladding V1. The camera-end cladding V1 includes the second camera-end side face K12.

The cladding part F is removed to provide access to screws 73 and 74 of the support structure-end locking mechanism BT and to the screws of the adapter locking mechanism B2 for undoing and/or tightening. The support structure-end part T1 is a hollow tube. The support structure interface TD is a screw clamp that is fastened, for example, to the ceiling D.

The support structure-end locking mechanism BT has a second clamping wedge (72), wherein tightening of the support structure-end locking mechanism BT presses the second clamping wedge (72) against a circumferential surface of the support structure-end part T1 in such a way that the support structure-end adapter T2 is frictionally immobilized relative to the support structure-end part T1.

The first connecting unit 78 can, for example, be a resilient pressure piece. The second connecting unit 79 can, for example, be a slot into which a resiliently mounted body of the pressure piece is pressed via a spring of the pressure piece.

Figure 5:
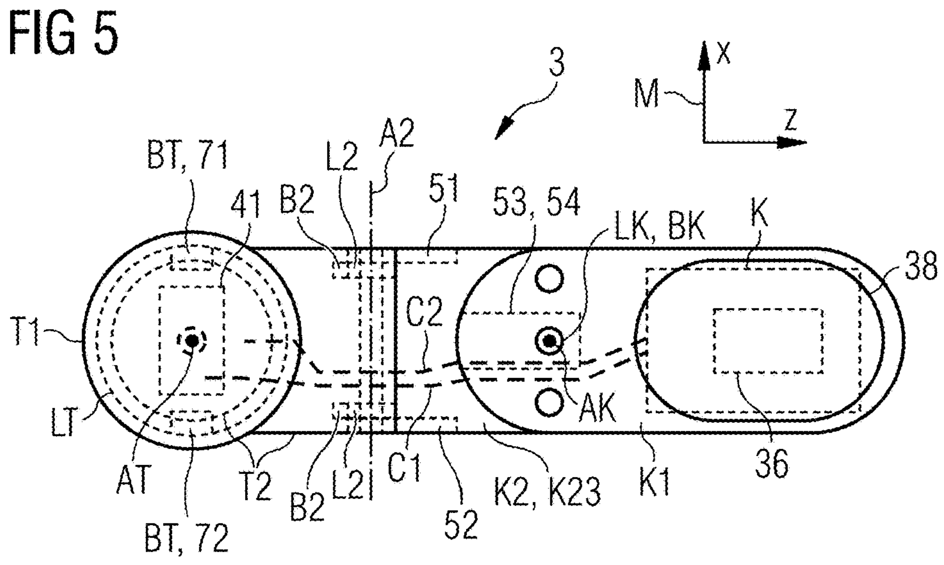
Figure 6:
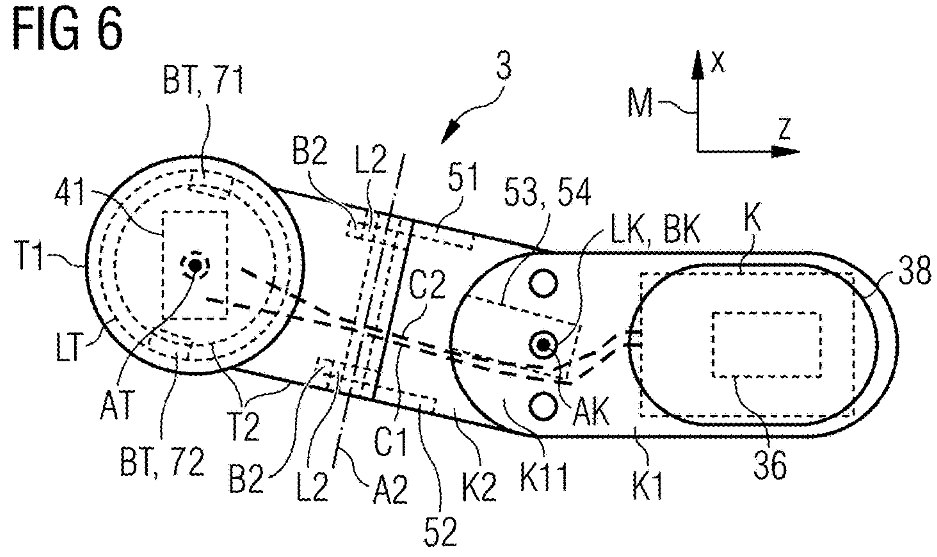

In order to move from the orientation shown in FIG. 5 to the orientation shown in FIG. 6, a swiveling movement of the camera-end part K1 relative to the camera-end adapter piece K2 around the camera-end swivel axis AK and a swiveling movement of the support structure-end adapter T2 relative to the support structure-end part T1 around the support structure-end swivel axis AT are combined in such a way that the camera-end part K1 is purely spatially translated and the positional change of the camera-end part K1 does not have a rotational component.

Figure 7:
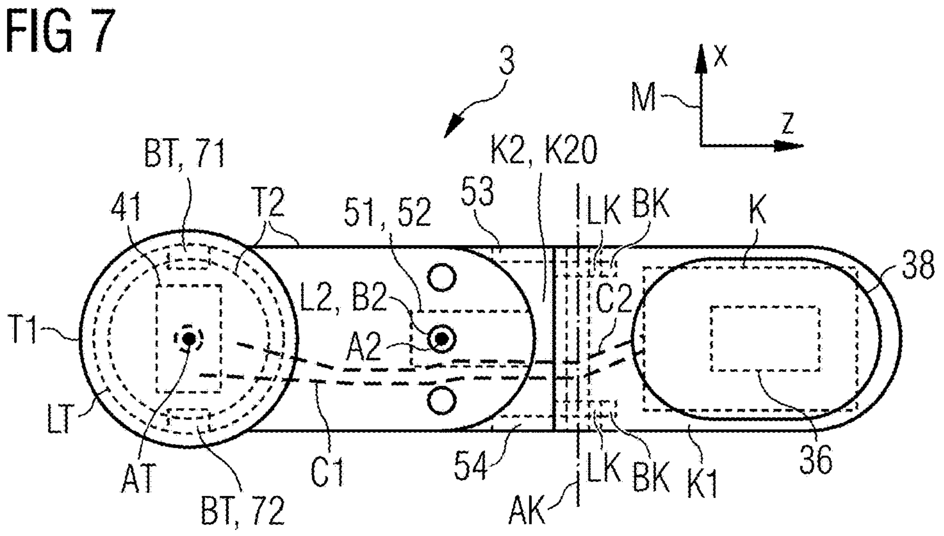
FIG. 7 shows a mounting device according to a second example.

FIG. 7 shows the mounting device 3 according to a second example, wherein the support structure-end swivel axis AT is parallel to the adapter swivel axis A2.

Figure 8:
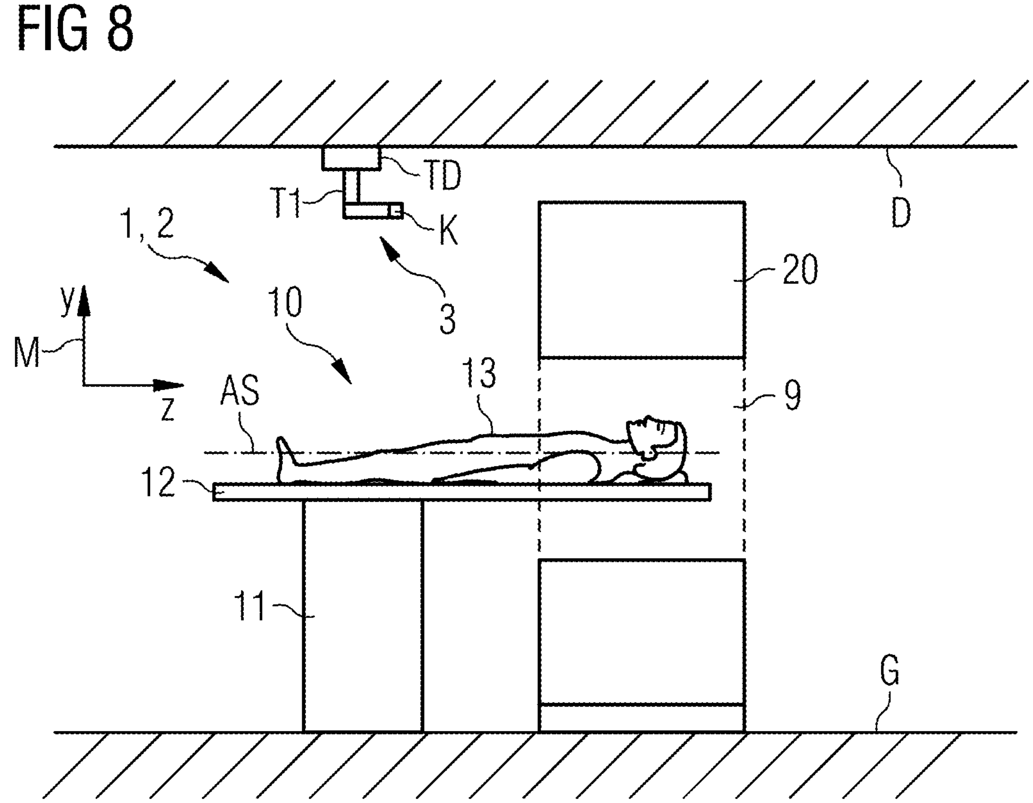
FIG. 8 shows a system with a medical imaging device and the mounting device.

FIG. 8 shows the system 1, including the medical imaging device 2, the camera K and the mounting device 3 for mounting the camera K, wherein the camera K is received in the camera-end part K1 of the mounting device 3. The medical imaging device 2 includes gantry 20, tunnel-shaped opening 9 and patient couch 10. A patient 13 can be introduced into the tunnel-shaped opening 9. An acquisition region is located in the tunnel-shaped opening 9. The patient couch 10 includes positioning base 11 and positioning plate 12 for positioning the patient 13. The positioning plate 12 can be introduced into the tunnel-shaped opening 9 by translational motion of the patient couch 10 and the gantry 20 relative to one another in a longitudinal direction of the positioning plate 12, in particular along the system axis AS. The medical examination room includes ceiling D and floor G. The mounting device 3 is fastened to the ceiling D via the support structure interface TD.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of the embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing embodiments. The present invention may, however, be embodied in many alternate forms and should not be construed as limited to only the embodiments set forth herein.

What is claimed is:

1. A mounting device for mounting a camera, the mounting device comprising:
- a camera-end part;
- a camera-end swivel bearing;
- a camera-end locking mechanism;
- a camera-end adapter;
- a support structure-end adapter;
- an adapter swivel bearing;
- an adapter locking mechanism; and
- a cable routing region, wherein
  - the camera-end part is configured to receive the camera and is mounted to swivel, relative to the camera-end adapter, around a camera-end swivel axis via the camera-end swivel bearing when the camera-end locking mechanism is undone,
  - the camera-end adapter is mounted to swivel, relative to the support structure-end adapter, around an adapter swivel axis via the adapter swivel bearing when the adapter locking mechanism is undone,
  - the cable routing region extends along a longitudinal line of the cable routing region through the support structure-end adapter and the camera-end adapter into the camera-end part,
  - the longitudinal line of the cable routing region runs substantially perpendicular to the adapter swivel axis in a region of the adapter swivel axis, and
  - the adapter swivel bearing and the adapter locking mechanism are arranged outside the cable routing region.

2. The mounting device as claimed in claim 1, wherein the camera-end swivel axis is perpendicular to the adapter swivel axis.

3. The mounting device as claimed in claim 1, wherein the camera-end swivel axis and the adapter swivel axis are spaced apart from one another along a portion of the longitudinal line of the cable routing region running through the camera-end adapter.

4. The mounting device as claimed in claim 1, wherein
- the camera-end adapter has a frame, a first plate-shaped projection and a second plate-shaped projection,
- the cable routing region extends through the frame,
- the first plate-shaped projection extends flat in a first plane from the frame to a first region of the adapter swivel bearing,
- the first plane is perpendicular to the adapter swivel axis,
- the second plate-shaped projection extends flat in a second plane from the frame to a second region of the adapter swivel bearing,
- the second plane is perpendicular to the adapter swivel axis, and
- the cable routing region is located in a region of the camera-end adapter between the first plane and the second plane.

5. The mounting device as claimed in claim 4, wherein
- the frame has a first frame side face and a second frame side face,
- the first region of the adapter swivel bearing is connected to the first frame side face via the first plate-shaped projection,
- the second region of the adapter swivel bearing is connected to the second frame side face via the second plate-shaped projection,
- the first frame side face is perpendicular to the adapter swivel axis and an edge of the first frame side face is curved in a first circular arc shape around the adapter swivel axis, and
- the second frame side face is perpendicular to the adapter swivel axis and an edge of the second frame side face is curved in a second circular arc shape around the adapter swivel axis.

6. The mounting device as claimed in claim 5, wherein
- the support structure-end adapter has a first support structure-end side face and a second support structure-end side face,
- the cable routing region is located in the region of the support structure-end adapter between the first support structure-end side face and the second support structure-end side face,
- the first support structure-end side face is perpendicular to the adapter swivel axis and an edge of the first support structure-end side face is curved in a third circular arc shape around the adapter swivel axis,
- the edge of the first support structure-end side face abuts the edge of the first frame side face,
- the second support structure-end side face is perpendicular to the adapter swivel axis and an edge of the second support structure-end side face is curved in a fourth circular arc shape around the adapter swivel axis, and
- the edge of the second support structure-end side face abuts the edge of the second frame side face.

7. The mounting device as claimed in claim 1, further comprising:
- a support structure-end part;
- a support structure-end swivel bearing; and
- a support structure-end locking mechanism; wherein
  - the support structure-end adapter is mounted to swivel, relative to the support structure-end part, around a support structure-end swivel axis via the support structure-end swivel bearing when the support structure-end locking mechanism is undone,
  - the cable routing region extends along the longitudinal line of the cable routing region through the support structure-end part to the support structure-end adapter,
  - a portion of the longitudinal line of the cable routing region running through the support structure-end part is substantially parallel to the support structure-end swivel axis, and
  - the support structure-end swivel bearing and the support structure-end locking mechanism are arranged outside the cable routing region.

8. The mounting device as claimed in claim 7, wherein the support structure-end swivel axis is perpendicular to the adapter swivel axis.

9. The mounting device as claimed in claim 7, wherein the support structure-end swivel axis and the adapter swivel axis are spaced apart from one another along a portion of the longitudinal line of the cable routing region running through the support structure-end adapter.

10. The mounting device as claimed in claim 7, further comprising:

a power supply unit and a power cable to supply the camera with electrical power; wherein the power supply unit is arranged in an interior of the support structure-end part, and the power cable runs within the cable routing region from the power supply unit into the camera-end part.

11. The mounting device as claimed in claim 7, wherein the support structure-end part is cylindrical, and a cylinder axis of the support structure-end part forms the support structure-end swivel axis.

12. The mounting device as claimed in claim 11, wherein the support structure-end locking mechanism has a first clamping wedge, and tightening of the support structure-end locking mechanism presses the first clamping wedge against a circumferential surface of the support structure-end part such that the support structure-end adapter is frictionally immobilized relative to the support structure-end part.

13. A system comprising:

a medical imaging device;

a camera; and the mounting device as claimed in claim 1, the mounting device configured to mount the camera, wherein the camera is received in the camera-end part of the mounting device.

14. A method for orienting a camera, wherein the camera is received in the camera-end part of the mounting device as claimed in claim 1, the method comprising:

undoing the camera-end locking mechanism;

swiveling the camera-end part, relative to the camera-end adapter, around the camera-end swivel axis;

tightening the camera-end locking mechanism;

undoing the adapter locking mechanism;

swiveling the camera-end adapter, relative to the support structure-end adapter, around the adapter swivel axis; and tightening the adapter locking mechanism.

15. A method for orienting a camera, wherein the camera is received in the camera-end part of the mounting device as claimed in claim 7, the method comprising:

undoing the support structure-end locking mechanism;

swiveling the support structure-end adapter, relative to the support structure-end part, around the support structure-end swivel axis; and tightening the camera-end locking mechanism.

16. The mounting device as claimed in claim 8, wherein the support structure-end swivel axis and the adapter swivel axis are spaced apart from one another along a portion of the longitudinal line of the cable routing region running through the support structure-end adapter.

17. The mounting device as claimed in claim 16, further comprising:

a power supply unit and a power cable to supply the camera with electrical power; wherein the power supply unit is arranged in an interior of the support structure-end part, and the power cable runs within the cable routing region from the power supply unit into the camera-end part.

18. The mounting device as claimed in claim 9, further comprising:

a power supply unit and a power cable to supply the camera with electrical power; wherein the power supply unit is arranged in an interior of the support structure-end part, and the power cable runs within the cable routing region from the power supply unit into the camera-end part.

19. The mounting device as claimed in claim 4, further comprising:

a support structure-end part;

a support structure-end swivel bearing; and a support structure-end locking mechanism; wherein the support structure-end adapter is mounted to swivel, relative to the support structure-end part, around a support structure-end swivel axis via the support structure-end swivel bearing when the support structure-end locking mechanism is undone, the cable routing region extends along the longitudinal line of the cable routing region through the support structure-end part to the support structure-end adapter, a portion of the longitudinal line of the cable routing region running through the support structure-end part is substantially parallel to the support structure-end swivel axis, and the support structure-end swivel bearing and the support structure-end locking mechanism are arranged outside the cable routing region.

20. The mounting device as claimed in claim 5, further comprising:

a support structure-end part;

a support structure-end swivel bearing; and a support structure-end locking mechanism; wherein the support structure-end adapter is mounted to swivel, relative to the support structure-end part, around a support structure-end swivel axis via the support structure-end swivel bearing when the support structure-end locking mechanism is undone, the cable routing region extends along the longitudinal line of the cable routing region through the support structure-end part to the support structure-end adapter, a portion of the longitudinal line of the cable routing region running through the support structure-end part is substantially parallel to the support structure-end swivel axis, and the support structure-end swivel bearing and the support structure-end locking mechanism are arranged outside the cable routing region.

* * * * *